H. Bradford.
Inkstand.
N° 53,729. Patented Apr. 3, 1866.
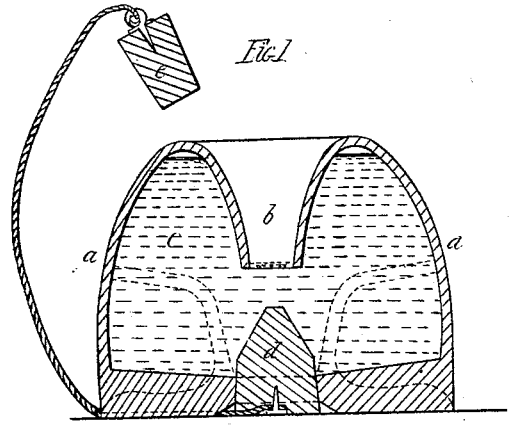
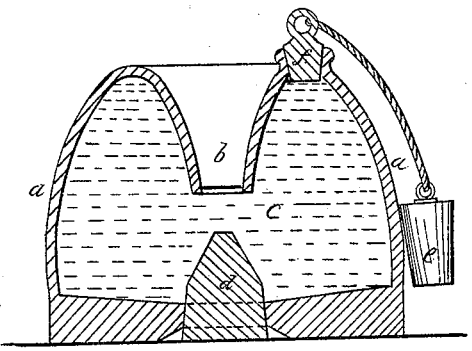
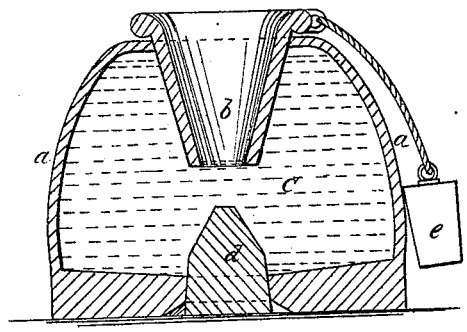
Witnesses:
Inventor
Hezekiah Bradford

UNITED STATES PATENT OFFICE.

HEZEKIAH BRADFORD, OF NEW YORK, N. Y., ASSIGNOR TO HORATIO BOGERT, OF SAME PLACE.

IMPROVEMENT IN INKSTANDS.

Specification forming part of Letters Patent No. 53,729, dated April 3, 1866; antedated March 30, 1866.

*To all whom it may concern:*

Be it known that I, HEZEKIAH BRADFORD, of the city and State of New York, have invented, made, and applied to use a certain new and useful Improvement in Inkstands; and I do hereby declare the following to be a full, clear, and exact description of the same, reference being had to the annexed drawings, making part of this specification, wherein—

Figure 1 is a vertical section of my improved inkstand, and Figs. 2 and 3 are similar views of slight modifications in my said inkstand.

Similar marks of reference denote the same parts.

Inkstands have heretofore been made with a reservoir containing a vertical tube or well, into which the pen is dipped, and in which tube the ink stands when filled at the same level as in the reservoir, and fountain-inkstands have been made in which the ink in the well stands at a lower level than in the fountain. My invention combines the advantageous features of both these inkstands; and it consists in a stopper combined with the well of the inkstand in such a manner as to exclude the ink from the well while the fountain is being filled, thereby maintaining only a certain depth of ink in the stand; and I also make use of a yielding cork stopper for the pen to come in contact with when dipped into the inkstand and regulate the amount of ink taken by the pen, and at the same time avoid injury to the nibs of the pen.

In the drawings, *a* is the inkstand, formed of glass or other suitable material, and either circular or polygonal.

*b* is the ink-well, extending down through the fountain *c*, and its lower end terminating at a suitable distance from the cork or elastic stopper *d*, which cork is made tapering or inclined at its upper end. The ink in the fountain will only descend as it is consumed at the bottom of the ink-well, and when the ink is used away so that a bubble of air passes into the fountain the ink then rises slightly in the well *b*. The depth of ink, therefore, is the distance from the lower end of the well *b* to the device that arrests the pen. This arresting of the pen is effected by the stopper or cork *d*, and when it is desired to dip the pen deeper into the ink it can be done by holding the pen at an inclination, so as to pass down farther into the ink before touching the inclined sides of the cork or yielding stopper.

In order to fill the inkstand I put a stopper, *e*, into the well *b*, so that its end comes about on a line with the lower end of the well, and I invert the inkstand and draw out the cork *d* and pour the ink into the stand, then insert the cork *d* and turn the inkstand back again and withdraw the stopper *e*. The stopper *e* is also to be employed with the inkstand shown in Figs 2 and 3 to prevent the ink rising in the well when the fountain is being filled. In these cases the inkstand does not have to be inverted, but may be filled by withdrawing the stopper *f*, Fig. 2, or lifting out the well, Fig. 3. In both cases the parts coming in contact are made air-tight by grinding them together. It will be evident that the cork or yielding stopper might be screwed in so as to adjust its position and retain it firmly.

If desired, the inkstand might be constructed with a contraction at the sides below the lower end of the ink-well, so that there will not be a body of ink that is not required for the fountain-action, as all the surface of the ink below the lower end of the well would be exposed to the air when the fountain was exhausted. For this reason only sufficient space is required around the cork to receive sediments. This contraction may be made by having the glass solid at this point, or the inkstand may be contracted, as shown by dotted lines in Fig. 1.

What I claim, and desire to secure by Letters Patent, is—

1. A stationary cork or yielding stopper, with or without a tapering or inclined end, against which the pen comes in contact when it is dipped into the ink, as set forth.

2. The combination of the stopper *e*, well *b*, and fountain *c*, as and for the purposes specified.

3. The fountain *c* and well *b*, in combination with a stopper in the bottom of inkstand, as set forth, whereby the fountain may be filled when the inkstand is inverted, as specified.

In witness whereof I have hereunto set my signature this 13th day of July, 1865.

HEZEKIAH BRADFORD.

Witnesses:
 THOS. GEO. HAROLD,
 CHAS. H. SMITH.